March 20, 1956

W. S. ERWIN 2,739,284

INDICATING APPARATUS

Filed Nov. 29, 1950

Inventor
Wesley S. Erwin
By Willits, Helmig & Baillio
Attorneys

United States Patent Office 2,739,284
Patented Mar. 20, 1956

2,739,284

INDICATING APPARATUS

Wesley S. Erwin, Detroit, Mich., assignor to General Motors Corporation, Detroit, Mich., a corporation of Delaware Application November 29, 1950, Serial No. 198,210

13 Claims. (Cl. 324—61)

This invention relates to indicating apparatus, and more particularly to a bridge type power input for such apparatus utilizing an A. C. voltage to indicate changes in a D. C. load.

One feature of the invention is that it provides improved bridge type power input apparatus wherein A. C. voltage is used to indicate changes in a D. C. load; another feature of the invention is that it provides an input arrangement for energizing a D. C. load and for indicating variations in said load, wherein an unfiltered power supply may be utilized; a further feature is that an A. C. indicating device may be utilized; another feature of the invention is that it provides a bridge circuit having one arm formed by a direct current actuated variable load device, and means for applying a varying voltage across the bridge input terminals whereby variations in the load are indicated by alternating current indicating means actuated by said varying voltage; a further feature of the invention is that connections to the alternating current indicating means may be through a variable gain amplifier, whereby the sensitivity of the indicating means may readily be adjusted; still another feature of the invention is that it provides a bridge circuit across which may be applied an unfiltered D. C. voltage having an A. C. component, the D. C. voltage actuating a variable load device in one of the bridge arms and the A. C. component providing an indication of variations in the load device; yet another feature of the invention is that the A. C. voltage component may be superimposed upon the D. C. actuating voltage which is applied across the input terminals of the bridge, and a single unfiltered power supply may provide both voltages; an additional feature of the invention is that only the A. C. voltage may be applied across the bridge input terminals, and the D. C. load actuating voltage may be applied directly to the load input circuit; and yet another feature of the invention is that the bridge may be constructed with reactive impedances in one side thereof to reduce D. C. power losses.

Figure 1:
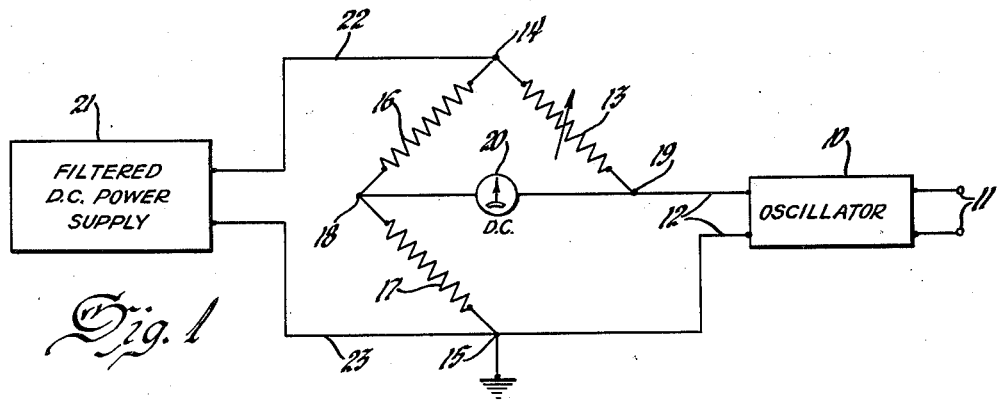
Figure 2:
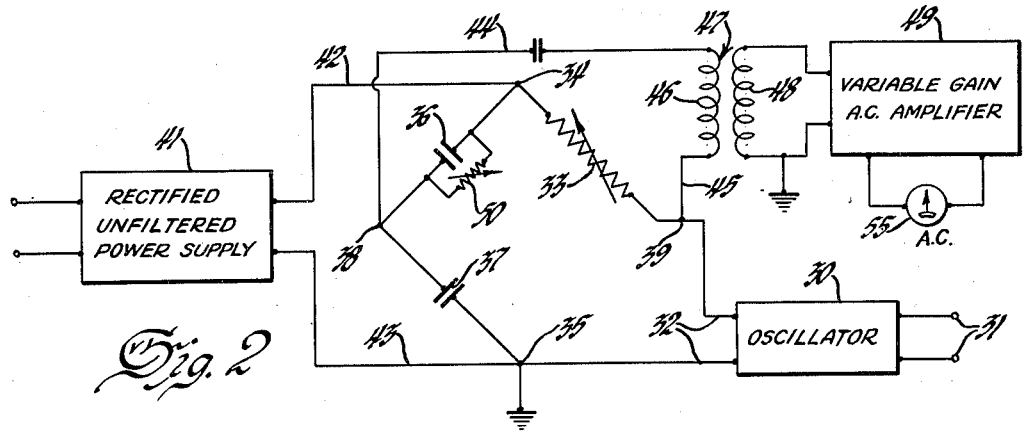
Figure 3:
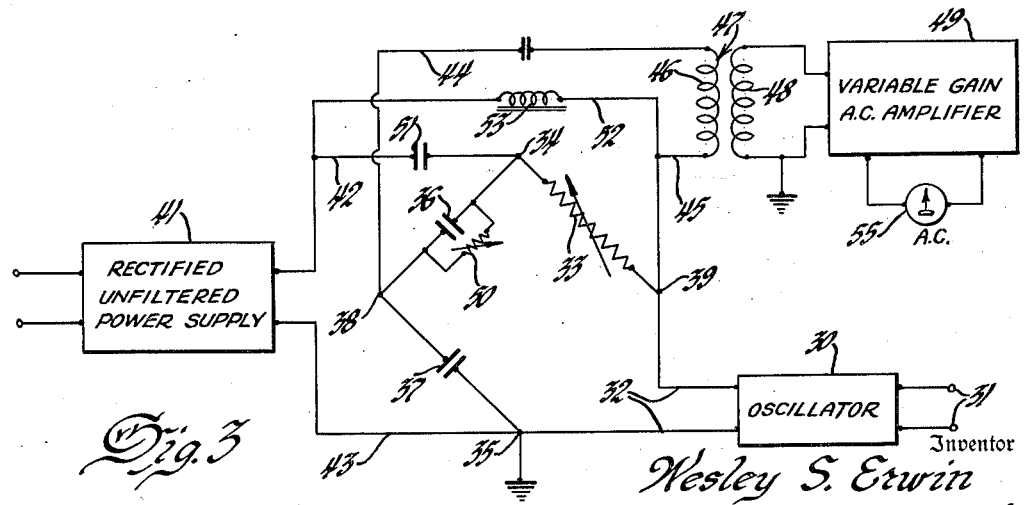

Other features and advantages of the invention will be apparent from the following description, and from the drawings in which:

Figure 1 is a schematic diagram of one type of indicating apparatus heretofore used; Figure 2 is a schematic diagram of improved indicating apparatus incorporating the invention in one form; and Figure 3 is a schematic diagram of improved indicating apparatus incorporating the invention in a modified form.

While the invention is applicable to many different types of indicating apparatuses utilizing a varying voltage to indicate changes in a direct current load, it is particularly advantageous for use with supersonic measuring means of the type disclosed in Erwin Patent No. 2,431,233 which issued November 18, 1947, and in Rassweiler et al. Patent No. 2,431,234 which issued November 18, 1947.

The supersonic measuring means disclosed in the above mentioned patents comprise a transducer, preferably a piezoelectric crystal, which is mounted in motion-transmitting relation with a member the thickness of which is to be tested. The crystal is forced to vibrate by an oscillator having its output connected thereto, and the frequency of oscillation is varied either by manual tuning as disclosed in Patent No. 2,431,233 or by automatic tuning means as disclosed in Patent No. 2,431,234. The resonant frequency of the crystal is outside the oscillator tuning range. When the frequency of the oscillator, and therefore the frequency of vibration of the crystal, is such that the thickness of the member under test is equal to one half wave length or integral multiples thereof, a resonant condition is set up and the member under test vibrates freely with relatively large mechanical amplitude compared to the off-resonance or forced vibrations, causing the mechanical power loading on the crystal to be substantially increased so that the electrical characteristics of the crystal change and the power input to the oscillator is sharply increased. If the wave length in the material of the member under test is known and the frequency of oscillation at the resonant condition is known, the thickness of the member under test can readily be ascertained despite the fact that only the outer surface of this member may be exposed.

In the measuring means disclosed in the above patents, the oscillator input circuit was fed from a filtered D. C. power supply through a direct current bridge which balanced out the oscillator no-load current. A meter or other D. C. indicating means was connected across the output terminals of the bridge.

Figure 1 illustrates schematically apparatus of the type utilized in these earlier patents. An oscillator 10 has output terminals 11 adapted to be connected to a crystal or other transducer (not shown) in the manner disclosed in the above mentioned patents. One branch of the bridge is formed by two series connected arms, one arm including the input circuit 12 of the oscillator and the other arm including a variable resistor 13, the arms 12 and 13 being connected across input terminals 14 and 15. The input terminal 14 is used for operating voltage connections to the bridge, and the terminal 15 is grounded. The other branch of the bridge comprises resistance arms 16 and 17 connected in series across the input terminals. Output terminals for the bridge are designated at 18 and 19, and a D. C. meter 20 is connected thereacross. The bridge is fed by a filtered D. C. power supply 21 which is connected across the input terminals 14 and 15 by means of leads 22 and 23.

The power supply and bridge arrangement of Figure 1 is basically equivalent to the bridge arrangement shown in Patent No. 2,431,233. In the operation of the supersonic measuring means the variable resistor 13 is so arranged that the oscillator no-load input current is balanced out in the bridge, so that under non-resonant conditions the meter 20 will give a zero reading. When resonant conditions are set up as above described, the oscillator plate current increases sharply, resulting in increased input and unbalancing the bridge and providing an indication on the meter 20.

In this apparatus it will be obvious that the power supply must be very carefully filtered so that substantially all ripple or A. C. component is removed from the D. C. output voltage of the power supply, since any A. C. component will cause the meter to vibrate. Furthermore, as is well known, D. C. meters are relatively fragile. However due to possible overloads caused by excessive currents when resonant conditions occur, the meter 20 also must be extremely rugged, necessitating a compromise insofar as sensitivity of the instrument is concerned.

The present invention provides a novel means for obviating these disadvantages and for doing away with the necessity for filtering the power supply output voltage. In accordance with the present invention an unfiltered power supply is used, having a D. C. voltage output with an A. C. component. The D. C. is utilized, as in Figure 1, to actuate the oscillator. The A. C. component is utilized to actuate the indicating means. Consequently, alternating current indicating means are utilized, such indicating means being more rugged than comparable direct current indicating means. Obviously no deleterious effect is caused by the presence of ripple voltage as is true in the circuit of Figure 1. In addition, it is possible to provide separate means for regulating the sensitivity of the alternating current means, and another advantage is obtained since the resistors in one branch of the bridge of Figure 1 may be replaced by reactive impedance means, eliminating the D. C. power loss through these resistors.

Figure 2 shows a preferred form of my invention. In Figure 2, reference characters twenty higher than those used in Figure 1 will designate similar parts. In Figure 2 the oscillator 30 has output terminals 31 for connection to a crystal or other transducer. The input circuit 32 of the oscillator forms one arm of a bridge, another arm being formed by a variable resistor 33, the arms 32 and 33 being connected in series across bridge input terminals 34 and 35. The other branch of the bridge comprises two series-connected arms having reactive impedances therein, here shown as condensers 36 and 37 respectively. The bridge is provided with output terminals 38 and 39. The bridge is fed by a rectified, unfiltered D. C. power supply 41 which is connected across the input terminals of the bridge by leads 42 and 43.

Instead of connecting a meter directly across the output terminals 38 and 39 as in Figure 1, alternating current coupling means are connected to said output terminals, leads 44 and 45 being utilized to connect the primary 46 of a transformer designated generally at 47 across the output terminals 38 and 39. The secondary 48 of the transformer is connected to the input of a variable gain alternating current amplifier 49, which may be of conventional, well known construction. Alternating current indicating means, here shown as a meter 55, is connected to the amplifier output circuit. In the bridge circuit a variable resistor 50 is connected across the condenser 36 in order to balance the bridge for A. C.

In the operation of the apparatus, the D. C. component of the rectifier voltage will be applied to the oscillator input circuit through lead 42, input terminal 34, resistor 33, and the high side of the oscillator input circuit, the return circuit being through the low side of said input circuit to the grounded bridge input terminal 35. The A. C. component of the power supply voltage output is applied across the bridge input terminals 34 and 35, and the elements are so adjusted, in cooperation with the input capacitance of the oscillator, that the bridge is balanced under no-load or non-resonant conditions. With the bridge in balance there is no current flow through the transformer primary 46, and consequently a zero indication is given by the A. C. meter 55. When a resonant condition occurs so that the oscillator plate current increases sharply, the changed input capacitance of the oscillator will cause the bridge to become unbalanced, and current will flow through the transformer primary 46 and be coupled by means of the secondary 48 into the input circuit of the variable gain amplifier 49 and the meter 55 will provide an indication of the unbalance. The gain of the amplifier 49 may be regulated to increase or decrease the sensitivity of the apparatus as desired.

If the power supply 41 is connected to a source of conventional commercial 60 cycle alternating current, and if the power supply is a full wave rectifier (as is generally preferable), the voltage output will have an A. C. ripple component of a frequency of 120 C. P. S. If desired a separate source may be provided for the A. C. voltage which is applied across the input terminals of the bridge, and the A. C. voltage may be of any desired frequency up to several thousand C. P. S. or more. The substitution of condensers 36 and 37 for resistors 16 and 17 of Figure 1 eliminates the D. C. power loss through these resistors.

In Figure 2 the A. C. meter 55 may be a rugged instrument, inasmuch as the variable gain amplifier 49 eliminates the necessity for making the meter sensitive. The necessity of attempting to eliminate all ripple from the power supply 41, and indeed, the necessity for filtering this power supply at all, is eliminated and the efficiency of the apparatus is increased since the bleeder arrangement comprising resistors 16 and 17 of Figure 1 has been eliminated.

In the modified form of the invention shown in Figure 3, wherein reference characters identical with those of Figure 2 are used to designate similar parts, the D. C. oscillator actuating voltage is not applied across the input terminals of the bridge, but is applied directly across the oscillator input circuit. Instead of applying the power supply D. C. voltage output to the bridge input terminal 34, a condenser 51 is inserted in the lead 42 to block direct current from being applied across the bridge input terminals, and a parallel lead 52 is connected between the lead 42 and the oscillator input circuit 32 to bypass the input terminal 34 and the resistor 33. A choke 53 in the lead 52 blocks A. C. from this by-pass circuit. By applying the actuating D. C. voltage directly across the oscillator input circuit, the efficiency is increased since there is no voltage drop in the applied voltage caused by the resistor 33. The apparatus of Figure 3 operates in generally the same manner as the apparatus of Figure 2, and therefore will not be described in detail.

While I have shown and described two embodiments of my invention, it is subject to many modifications. Changes, therefore, in the construction and arrangement may be made without departing from the spirit and scope of the invention as set forth in the appended claims.

I claim:

1. Indicating apparatus of the character described, comprising: a bridge circuit having input and output terminals, one side of said bridge comprising a resistance arm and an arm formed by a direct current actuated variable load device, said arms being connected in series across said input terminals; means outside said bridge providing sources of varying voltage and of D. C. voltage; circuit means for applying said varying voltage said D. C. voltage across said input terminals; and alternating current indicating means coupled to the output terminals of said bridge.

2. Apparatus of the character claimed in claim 1, wherein the other side of said bridge comprises two condensers connected in series across said input terminals.

3. Indicating apparatus of the character described, comprising: a bridge circuit having input and output terminals, one side of said bridge comprising an impedance arm and an arm formed by the input circuit of an oscillator having an output which varies in power, said arms being connected in series across said input terminals; unfiltered power supply means outside said bridge providing a D. C. voltage output with an A. C. component; circuit connections for applying said voltage output across said input terminals of said bridge; alternating current coupling means connected to the output terminals of said bridge; a variable gain alternating current amplifier having its input connected to said coupling means; and alternating current indicating means connected to said amplifier.

4. Indicating apparatus of the character described, comprising: a bridge circuit having input and output terminals, one side of said bridge comprising a resistance arm and an arm formed by the input circuit of an oscillator having an output which varies in power, said arms being connected in series across said bridge input terminals, the other side of said bridge comprising two condensers connected in series across said input terminals; power supply means providing a D. C. voltage with an A. C. component; circuit connections between said power supply and bridge for applying said A. C. voltage component across said input terminals; circuit connections between said power supply and bridge for applying said D. C. voltage directly across said oscillator input circuit for actuating said oscillator; alternating current coupling means connected to the output terminals of said bridge; a variable gain alternating current amplifier having its input connected to said coupling means; and alternating current indicating means connected to said amplifier.

5. Indicating apparatus of the character described, including: a bridge circuit having input and output terminals, one arm of said bridge comprising a direct current actuated variable load device; an unfiltered direct current power supply providing sources of varying voltage and of D. C. voltage; means for applying said varying voltage across said input terminals of the bridge and said D. C. voltage to said load device; and alternating current indicating means coupled to the output terminals of said bridge.

6. Indicating apparatus of the character described, including: a bridge circuit having input and output terminals, one arm of said bridge comprising a direct current actuated variable load device; means outside said bridge providing sources of varying voltage and of D. C. voltage; means for applying both said voltages across said input terminals of the bridge; and alternating current indicating means coupled to the output terminals of said bridge.

7. Indicating apparatus of the character described, including: a bridge circuit having input and output terminals, one arm of said bridge comprising a direct current actuated variable load device; an unfiltered direct current power supply providing sources of varying voltage and of D. C. voltage; means for applying both said voltages across said input terminals of the bridge; and means for indicating the amount the bridge is unbalanced, comprising alternating current indicating means coupled to the output terminals of said bridge.

8. Apparatus for indicating variations in the power input of an oscillator, including: a bridge circuit having input and output terminals, one arm of said bridge comprising the oscillator input circuit; an unfiltered direct current power supply providing sources of varying voltage and of D. C. voltage; means for applying both said voltages across said input terminals of the bridge; and alternating current indicating means coupled to the output terminals of said bridge.

9. Apparatus for indicating variations in the power input of an oscillator, including: a bridge circuit having input and output terminals, one arm of said bridge comprising the input circuit of the oscillator; an unfiltered direct current power supply providing sources of varying voltage and of D. C. voltage; means for applying said varying voltage across said input terminals of the bridge and said D. C. voltage across the input terminals of said oscillator; and alternating current indicating means coupled to the output terminals of said bridge.

10. Indicating apparatus of the character described, including: a bridge circuit having input and output terminals, one arm of said bridge comprising an oscillator input circuit; an unfiltered direct current power supply providing sources of varying voltages and of D. C. voltage; means for applying both said voltages across said input terminals of the bridge; alternating current coupling means connected to the output terminals of said bridge; a variable gain alternate current amplifier having its input connected to said coupling means; and means for indicating variations in the power input of the oscillator, comprising alternating current indicating means connected to said amplifier.

11. Indicating apparatus of the character described, including: a bridge circuit having input and output terminals, one arm of said bridge comprising the input circuit of an oscillator having an output which varies in power, another arm comprising a resistance, and two other arms comprising capacitive impedances; an unfiltered direct current power supply having a D. C. voltage output with an A. C. voltage component; means for applying said A. C. voltage across said input terminals of the bridge and said D. C. voltage across said oscillator input circuit; alternating current coupling means connected to the output terminals of said bridge; a variable gain alternating current amplifier having its input connected to said coupling means; and alternating current indicating means connected to said amplifier.

12. Indicating apparatus of the character described, including: a bridge circuit having input and output terminals, one side of said bridge comprising a resistance arm and an arm formed by a direct current actuated variable load device, said arms being connected in series across said input terminals; an unfiltered direct current power supply providing a varying voltage and a D. C. voltage; means for applying said varying voltage across said input terminals; means for applying said D. C. voltage across only said variable load device for actuating said device; and alternating current indicating means coupled to the output terminals of said bridge.

13. Apparatus of the character claimed in claim 12, including means for blocking D. C. from the bridge input terminals and means for blocking A. C. from the variable load device.

References Cited in the file of this patent

UNITED STATES PATENTS

| | | |
|---|---|---|
| 1,652,241 | Hall | Dec. 13, 1927 |
| 2,431,233 | Erwin | Nov. 18, 1947 |
| 2,459,104 | Gilbert | Jan. 11, 1949 |
| 2,567,253 | Strange et al. | Sept. 11, 1951 |
| 2,585,121 | Hartman | Feb. 12, 1952 |